US012065862B2

(12) United States Patent
Inan et al.

(10) Patent No.: US 12,065,862 B2
(45) Date of Patent: Aug. 20, 2024

(54) MOTOR VEHICLE LOCK

(71) Applicant: Kiekert AG, Heiligenhaus (DE)

(72) Inventors: Ömer Inan, Dorsten (DE); Holger Schiffer, Meerbusch (DE); Michael Scholz, Essen (DE); Peter Szegeny, Engelskirchen (DE)

(73) Assignee: Kiekert AG, Heiligenhaus (DE)

(*) Notice: Subject to any disclaimer, the term of this patent is extended or adjusted under 35 U.S.C. 154(b) by 329 days.

(21) Appl. No.: 17/286,516

(22) PCT Filed: Oct. 17, 2019

(86) PCT No.: PCT/DE2019/100903
§ 371 (c)(1),
(2) Date: Apr. 19, 2021

(87) PCT Pub. No.: WO2020/083435
PCT Pub. Date: Apr. 30, 2020

(65) Prior Publication Data

US 2021/0355722 A1 Nov. 18, 2021

(30) Foreign Application Priority Data

Oct. 22, 2018 (DE) ..................... 10 2018 126 165.9
Sep. 5, 2019 (DE) ..................... 10 2019 123 837.4

(51) Int. Cl.
*E05B 85/26* (2014.01)
*E05B 77/36* (2014.01)
(Continued)

(52) U.S. Cl.
CPC .............. *E05B 81/16* (2013.01); *E05B 77/36* (2013.01); *E05B 81/04* (2013.01); *E05B 85/243* (2013.01); *E05B 85/26* (2013.01)

(58) Field of Classification Search
CPC ........ E05B 85/20; E05B 85/24; E05B 85/243; E05B 85/26; E05B 77/36; Y10T 292/1047; Y10T 292/1082; Y10T 292/23
See application file for complete search history.

(56) References Cited

U.S. PATENT DOCUMENTS

| | | | | |
|---|---|---|---|---|
| 5,868,444 A * | 2/1999 | Brackmann | ............. | E05B 81/20 292/216 |
| 7,243,974 B2 * | 7/2007 | Kondo | ............... | B60N 2/01583 292/216 |

(Continued)

FOREIGN PATENT DOCUMENTS

| | | | |
|---|---|---|---|
| DE | 202008012086 U1 * | 2/2009 | ............. E05B 85/26 |
| DE | 102009029023 A1 | 3/2011 | |

(Continued)

OTHER PUBLICATIONS

Translation of International Search Report issued Feb. 21, 2020, for International Patent Application No. PCT/DE2019/100903.

*Primary Examiner* — Kristina R Fulton
*Assistant Examiner* — Noah Horowitz
(74) *Attorney, Agent, or Firm* — Renner, Otto, Boisselle & Sklar, LLP

(57) ABSTRACT

A motor vehicle lock, in particular a motor vehicle door lock, which is provided with a locking mechanism consisting substantially of a rotary latch and a pawl. In addition, a latching element, which is arranged in the engagement region between two locking mechanism components is provided, wherein said latching element is pivotably mounted on the rotary latch and/or the pawl for the most part in a plane of the locking mechanism (E). According to the invention, the latching element has a guide extension, which projects relative to the plane of the locking mechanism (E), for additional axial and/or radial guidance.

18 Claims, 10 Drawing Sheets

(51) Int. Cl.

| | |
|---|---|
| ***E05B 81/04*** | (2014.01) |
| ***E05B 81/16*** | (2014.01) |
| ***E05B 85/24*** | (2014.01) |

(56) References Cited

U.S. PATENT DOCUMENTS

| | | | | |
|---|---|---|---|---|
| 7,357,436 | B2 * | 4/2008 | Willing | B60N 2/919<br>297/336 |
| 7,926,858 | B2 * | 4/2011 | Otsuka | B60N 2/305<br>292/216 |
| 8,511,723 | B2 * | 8/2013 | Otsuka | B60N 2/01583<br>292/216 |
| 8,708,377 | B2 * | 4/2014 | Ishikawa | B60N 2/3011<br>292/216 |
| 8,950,810 | B2 * | 2/2015 | Dryburgh | B60N 2/01583<br>297/378.13 |
| 9,039,089 | B2 * | 5/2015 | Ohba | B60N 2/366<br>297/335 |
| 9,765,554 | B2 * | 9/2017 | Cumbo | E05B 81/70 |
| 11,377,880 | B2 * | 7/2022 | Mihail | B60N 2/01583 |
| 11,512,510 | B2 * | 11/2022 | Ottino | E05B 77/04 |
| 2017/0089103 | A1 * | 3/2017 | Ottino | E05B 81/16 |
| 2021/0032911 | A1 * | 2/2021 | Ishiguro | E05B 81/42 |
| 2021/0156175 | A1 * | 5/2021 | Ishiguro | E05B 81/44 |

FOREIGN PATENT DOCUMENTS

| | | | |
|---|---|---|---|
| DE | 112012002272 | T5 | 3/2014 |
| EP | 0406777 | A1 | 1/1991 |
| EP | 2031164 | A2 | 3/2009 |
| FR | 2472651 | A1 | 7/1981 |
| JP | S6323464 | U | 2/1988 |
| WO | 2014090216 | A2 | 6/2014 |
| WO | 2016146110 | A1 | 9/2016 |

* cited by examiner

MOTOR VEHICLE LOCK

This application is a national phase of International Application No. PCT/DE2019/100903 filed Oct. 17, 2019, which claims priority to German Application No. 10 2018 126 165.9 filed Oct. 22, 2018 and German Application No. 10 2019 123 837.4 filed Sep. 5, 2019.

FIELD OF DISCLOSURE

The invention relates to a motor vehicle lock, in particular a motor vehicle door lock, comprising a locking mechanism consisting substantially of a rotary latch and a pawl, and comprising a latching element arranged in the engagement region between the rotary latch and the pawl or generally in the engagement region between two locking mechanism components, which latching element is pivotably mounted on the rotary latch and/or the pawl, for the most part in a plane of the locking mechanism.

BACKGROUND OF DISCLOSURE

Motor vehicle locks refer to locks in or on motor vehicles, for example motor vehicle door locks, but also motor vehicle hoods, motor vehicle tailgate locks, motor vehicle tank locks, locks for seat locking mechanisms, charging port locks, etc. Due to the acoustic optimizations which have been carried out in and on motor vehicles for years, increasingly high requirements are placed on the noise behavior of motor vehicle locks. At the same time, the focus is on improving comfort. The engagement region between the rotary latch and the pawl, as two locking mechanism components, has a decisive influence on the acoustics as well as the haptics and comfort during operation. In principle, however, the engagement region can also be such an engagement region between two pawls in a multi-pawl locking mechanism, for example the engagement region between a so-called comfort pawl and a pawl.

For this reason, there are already approaches in the prior art for improving the surface quality of the engagement region between the rotary latch and the pawl or between the two pawls. For this purpose, WO 2016/146110 A1 from the applicant operates using a flexible damping element as a component element of a locking mechanism component. For this purpose, the casing of the locking mechanism component has a pocket for accommodating a metal main body, and the flexible damping element is also inserted into the casing. In fact, the flexible damping element can be latched to the casing, for example. In this way, a simple design and inexpensive manufacture are observed.

The further prior art according to WO 2014/090216 A2 describes a motor vehicle lock in which contours for puzzle components are stamped out in the engagement region when individual locking mechanism components are stamped. The puzzle components are inserted into the contours in a positionally secured manner by means of a sliding or low-friction edge surface. This has a positive effect when the rotary latch and pawl are rubbed against one another in the engagement region. The contours for the puzzle pieces can in this case be arranged in the main latch region of the rotary latch.

In another motor vehicle lock from the applicant, the latching element is pivotably accommodated in the rotary latch in the engagement region between the rotary latch and the pawl. In this case, any pivoting movements of the latching element take place for the most part in the plane of the locking mechanism, therefore in the plane spanned by the rotary latch and the pawl. In this way, a structurally simple solution and an inexpensive variant is provided in order to be able to open such a motor vehicle lock easily and at the same time ensure low-noise operation. This has proven itself in principle.

As a result of the generic prior art according to DE 11 2012 002 272 T5, a motor vehicle lock has become generally known that has a primary pawl which is rotatably mounted in an auxiliary rotary latch. A secondary pawl is also provided. The primary pawl can hold the rotary latch in a locking bolt engagement position. In addition, a rotary latch release position is also provided, in which the primary pawl allows the rotary latch to move out of the locking bolt engagement position. In this case the primary pawl substantially assumes the function of the previously mentioned latching element.

However, the prior art still allows optimizations to the effect that the guidance of the latching element is improved. This is because the previously mentioned solutions can lead to problems in practice, such that, during an interaction between the pawl and the rotary latch in the engagement region, the latching element may tilt and/or leave the plane of the locking mechanism. The invention as a whole seeks to remedy this.

SUMMARY OF DISCLOSURE

The invention is based on the technical problem of further developing such a motor vehicle lock and in particular a motor vehicle door lock in such a way that the guidance of the latching element is improved, taking into account a solution which is structurally simple and, at the same time, low-noise.

In order to solve this technical problem, a generic motor vehicle lock, in the context of the invention, is characterized in that the latching element has a guide extension which projects relative to the plane of the locking mechanism for additional axial and/or radial guidance.

In the context of the invention, the guidance of the latching element in the engagement region between the rotary latch and the pawl or between the two pawls and, consequently, in the engagement region between two locking mechanism components, is thus first improved. In this case, the latching element still ensures, in an unchanged manner, that the locking mechanism can be opened particularly easily and slat.

The latching element, which is pivotably mounted on the rotary latch, for the most part in the plane of the locking mechanism, or the latching element, which is mounted, for example, in the comfort pawl, ensures that the pawl and the rotary latch or the comfort pawl and the pawl can roll on one another perfectly and with little noise during the mentioned torque transmission. According to the invention, the additionally provided projecting guide extension on the latching element ensures that the latching element does not leave the pivot plane or the plane of the locking mechanism and is not tilted. Rather, the guide extension projecting relative to the plane of the locking mechanism ensures that the latching element is provided with additional axial and/or radial guidance. As a result, the described rolling process between the pawl and the rotary latch or between the comfort pawl and the pawl is further improved. As a result, the functional reliability is increased and, in comparison with the prior art, further improved noise values are observed. Herein lie the essential advantages.

According to an advantageous embodiment, the guide extension is formed in one piece with the latching element, for example as an embossing. As a result, the guide extension can be integrated particularly easily into the manufacturing process of the latching element. This is because the latching element is usually a stamped component made of steel, it being possible to combine the stamping process with the embossing process to form the guide extension.

Alternatively, the guide extension can also be designed as an additional element. In this case, the guide extension can be a plastics part or a separate component made from a different material. For example, the guide extension can be formed from plastics material as a component of a plastics cover of the latching element. There is also the possibility of designing the guide extension as, for example, a push-through pin. For this purpose, this push-through pin is inserted into a recess in the latching element, for example.

In order to provide the desired additional axial and/or radial guidance using the guide extension in this way, it has proven useful for the guide extension to engage in a recess in the rotary latch or generally in a recess in the locking mechanism component which supports said guide extension. If the guide extension is designed, for example, as a push-through pin and the recess does not have a limiting arcuate design, an additional radial guidance of the latching element can be provided and implemented in this way. The recess in the rotary latch can in this case be provided in a casing of the rotary latch. If the latching element is pivotably mounted in a comfort pawl in the case of a multi-pawl locking mechanism, the recess is correspondingly located in a casing of said comfort pawl.

The casing of the rotary latch or the comfort pawl is typically a plastics casing, which is usually provided in any case and in order to improve noise damping. As a result, the recess for the guide extension can be provided and implemented particularly easily and precisely. In this context, the design can also be implemented and realized in such a way that the latching element, together with the rotary latch (comfort pawl), is inserted, for example, into an injection molding tool. When encapsulating the rotary latch (comfort pawl), the recess for, for example, the push-through pin can then be defined directly as a guide extension in the casing of the rotary latch (comfort pawl).

If the latching element is then accommodated in a pocket formed by the casing of the rotary latch (comfort pawl), the latching element is not only provided with the required pivotable mounting, for the most part in the plane of the locking mechanism, in the course of the encapsulation with the plastics material, but, at the same time, is also guided radially with the aid of the guide extension in the recess in the casing of the rotary latch. This can be implemented in a particularly simple and inexpensive manner.

In principle, however, it is also possible to produce the latching element and the rotary latch (comfort pawl) with the casing separately, and to then combine them with one another, for example by inserting the push-through pin into the recess in the latching element held in the pocket in the casing of the rotary latch (comfort pawl).

In addition to the previously described radial guidance of the latching element relative to the rotary latch (comfort pawl) by the exemplary engagement of the guide extension in the recess in the casing of the rotary latch (comfort pawl), there is also, in principle, the further possibility of an additional axial guidance of the latching element. The projecting guide extension is used again for this purpose. In fact, for this purpose, the guide extension can engage in a recess in a housing. In this case, the housing generally accommodates the locking mechanism in the interior thereof. With the aid of the recess in the housing, the guide extension can be guided both axially and radially. The same then naturally also applies to the latching element which is pivotably mounted on the rotary latch in the plane of the locking mechanism.

Alternatively, however, it is also possible for the guide extension to simply rest against the housing accommodating the locking mechanism in a gripping manner. In this way, the guide extension is provided with the additional axial guidance desired according to the invention by means of contact with the housing. Of course, the two additional measures can also be combined with one another. In any case, the latching element pivotably mounted on the rotary latch (comfort pawl) is additionally secured, specifically relative the rotary latch (comfort pawl) accommodating the latching element and/or relative to the housing. This additional securing ensures an axial support of the latching element, for example relative to the housing accommodating the locking mechanism.

Alternatively or in addition, however, the latching element can also be provided with a supplementary radial guidance. This radial guidance can again be carried out relative to the housing. In general, however, the radial guidance of the latching element is implemented and brought about in such a way that the guide extension on the latching element engages in a recess in the rotary latch (comfort pawl) for this purpose.

The invention is based on the knowledge that the latching element pivotably mounted on the rotary latch is moved together with the rotary latch and, consequently, the additional radial guidance of the latching element on the rotary latch (comfort pawl), which provides a pivot mounting, can be advantageously realized. This radial guidance can be provided and implemented particularly easily by the interplay between the guide extension on the latching element and the recess in a casing of the rotary latch (comfort pawl).

According to a further advantageous embodiment of independent significance, the latching element can be equipped with a projection. This projection can be designed as an end stop which interacts with the pawl. In this case, the projection therefore assumes the function of the end stop or of a stop in general, i.e. limits any pivoting movements of the latching element relative to the rotary latch. The projection interacts with the pawl for this purpose.

Alternatively or in addition, however, the projection can also be designed as an opening lever for the latching element. In this case, the projection acts as an opening lever acting on the latching element and, for example, supports an opening function of the pawl relative to the rotary latch. For this purpose, the projection in question or the opening lever provided in this way can be acted on by a release lever which is in turn is acted upon manually and/or by a motor.

According to a further advantageous embodiment, a stop can also be provided for the latching element in order to limit the pivoting movement thereof. In this case, the stop is not necessarily an end stop and the previously mentioned projection of the latching element. Rather, the stop is advantageously formed on the housing accommodating the locking mechanism. The invention is based on the knowledge that the locking mechanism is typically mounted in a metal lock case which is in turn closed with the aid of a lock cover or lock housing made of plastics material. As a result, any additional formations, such as the recess for the guide extension or the stop, can be easily provided on or in the housing, specifically integrated into the plastics injection molding process for the housing, which is necessary anyway.

According to a further advantageous embodiment, the latching element and/or the pawl has reinforcement in the region of the mutual contact surface. This reinforcement ensures that the contact region or the contact surface on the pawl, as well as on the latching element, is reinforced if necessary. The invention is based on the knowledge that, in the latching position (pre-latching position and/or main latching position) of the locking mechanism, the pawl rests against the latching element, which is in turn pivotably mounted on the rotary latch (comfort pawl). An opening movement of the pawl is thus converted into a pivoting movement of the latching element relative to the rotary latch (comfort pawl). In order to keep the wear as low as possible in this region of the mutual contact surfaces between the latching element and the pawl, the reinforcement in question can be provided in the region of the mutual contact surface. In addition or as an alternative, surfaces having particularly low coefficients of friction have proven to be favorable here.

According to a further advantageous embodiment, the locking mechanism consisting substantially of a rotary latch and pawl is not a simple locking mechanism having a rotary latch and a pawl. Rather, in addition to the pawl, an additional pre-latching pawl and/or comfort pawl can be provided. In this case, the locking mechanism is designed as a multi-pawl locking mechanism or a multiple locking mechanism. In this context, the invention recommends that the latching element is still pivotably mounted in the rotary latch or the comfort pawl. However, in such a case, an interaction with the pawl typically only takes place in the main latching position, while the interaction between the pre-latching pawl and the rotary latch is realized and implemented via a pre-latching bolt which is additionally provided on the rotary latch, as will be explained in more detail below with reference to the description of the drawings.

It is, however, also possible for the rotary latch to interact with a comfort latch. In this case, the latching element is pivotably mounted in the comfort pawl. The comfort pawl, together with the latching element pivotably accommodated thereon or therein, then interacts with the pawl.

In addition, and according to a further advantageous embodiment, the pawl and/or the latching element can be equipped with an undercut. In the context of the invention, such an undercut of the pawl means that a force vector directed from the latching element to the pawl does not pass through an axis of the pawl, but instead generates a torque that closes the pawl. Conversely, the pawl can also act on the latching element with a force vector which does not pass through an axis of the latching element, but instead acts on the latching element in a closing sense, i.e. with a closing torque. The latching element is then equipped with the undercut.

Finally, the latching element is generally mounted in a casing of the associated locking mechanism component or the rotary latch or also the comfort pawl so as to have additional load contact with the core of the locking mechanism component, and optionally an interposed damping element. As a result, a metal contact between the latching element and the associated locking mechanism component (rotary latch or comfort pawl) is only observed under load, such that the pivoting movement of the latching element relative to the locking mechanism component is guided solely by the casing and can thus be implemented with particularly little noise. Only when a large load is applied does a metal contact or load contact of the latching element with the core of the locking mechanism component occur, such that large forces can be transmitted in such a case.

The optionally interposed damping element between the latching element and the locking mechanism component (rotary latch or comfort pawl) supporting the latching element also ensures particularly low-noise operation. This damping element can be a spring pocket formed in the casing.

As a result, a motor vehicle lock is provided that provides particularly functionally reliable operation together with a noise-optimized mounting of the latching element relative to the locking mechanism component accommodating the latching element. All of this is achieved using a solution which is structurally simple and optimized in terms of manufacture. Herein lie the essential advantages.

BRIEF DESCRIPTION OF DRAWINGS

The invention is explained in greater detail below with reference to drawings showing only one embodiment, which show.

DETAILED DESCRIPTION

Figure 1:
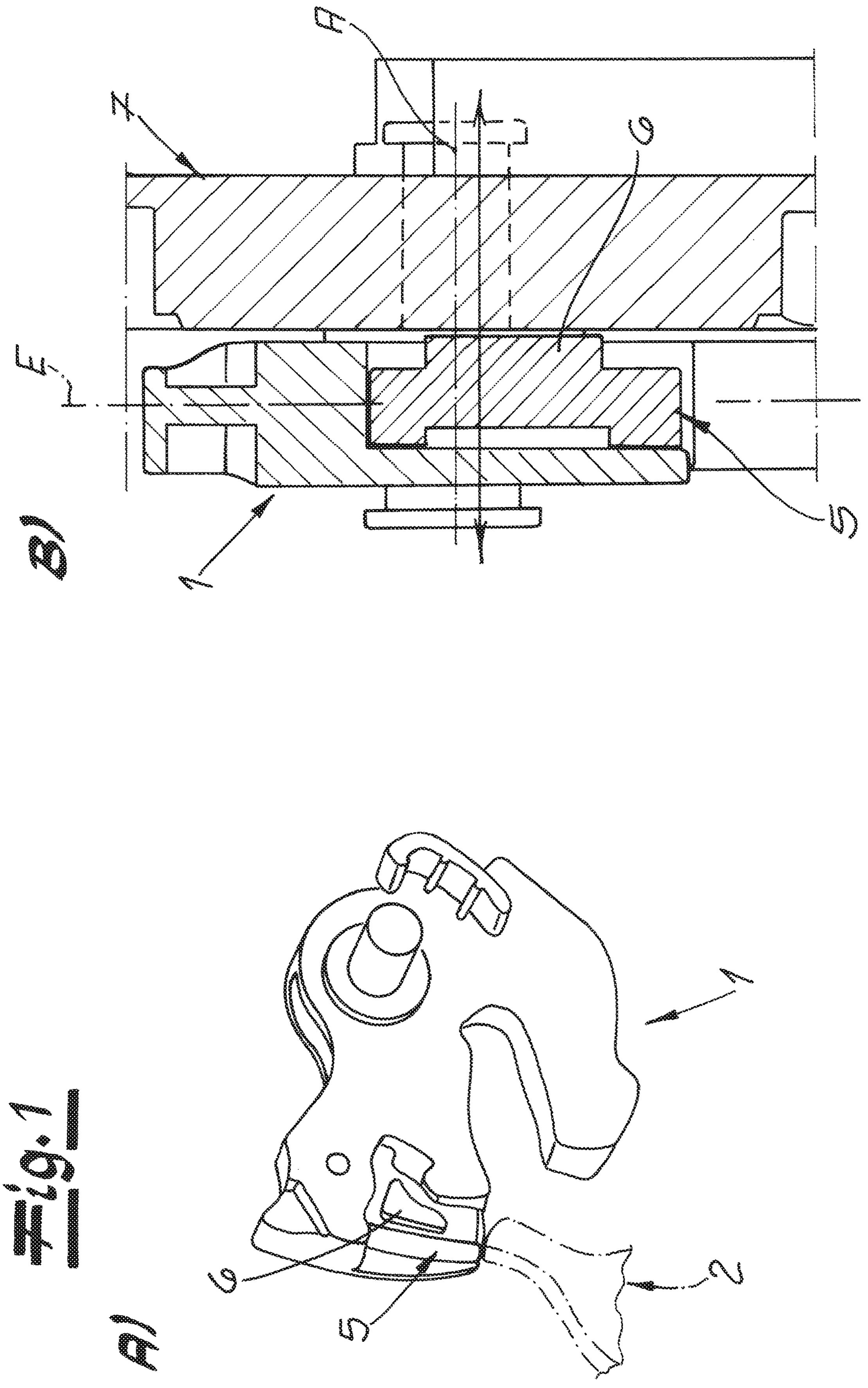
FIG. 1 A, B the motor vehicle lock according to the invention reduced to the essential components, schematically and in a side view, FIG. 2 A, B a modified embodiment, again in perspective and in a side view, FIG. 3 A, B, C another variant, again in perspective and in a side view, FIG. 4 a fourth embodiment variant having an additional pre-latching pawl, FIG. 5 A, B, C another embodiment having a projection on the latching element in different functional positions, FIG. 6 another sixth embodiment variant, FIG. 7 another embodiment of the invention, having a projection on the latching element, FIGS. 8A and 8B two variants having an undercut on the pawl (FIG. 8A) and an undercut on the latching element (FIG. 8B), FIG. 9 a further ninth embodiment of the invention and FIG. 10 a tenth embodiment variant according to the invention.

In the drawings, a motor vehicle lock is shown, which is not limited to a motor vehicle door lock. The motor vehicle lock or motor vehicle door lock has a locking mechanism 1, 2, 3, which, in the variant according to FIGS. 1 A, B to 3 A, B, C and 5 A, B, C and 7 to 10, is a simple locking mechanism 1, 2 having a rotary latch and a pawl 2. In the variant according to FIGS. 4 and 6, however, a multi-pawl locking mechanism or a multiple locking mechanism 1, 2, 3 having a rotary latch 1 and two pawls 2, 3 is used.

Figure 4:
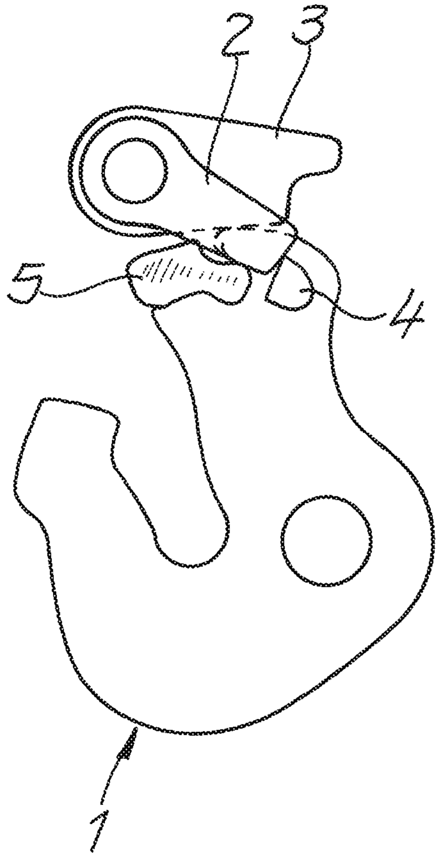

In fact, the multi-pawl locking mechanism 1, 2 3 operates using the rotary latch 1, a first pawl 2, which is designed as a pre-latching pawl, and a second pawl 3, as shown in FIG. 4. The first pawl 2 in this case interacts with a pre-latching bolt 4 on the rotary latch 1. The second pawl 3 in this case only comes to interact with the rotary latch 1 or a latching element 5, which is to be described in more detail below, in a main latching position (not shown here).

Figure 6:
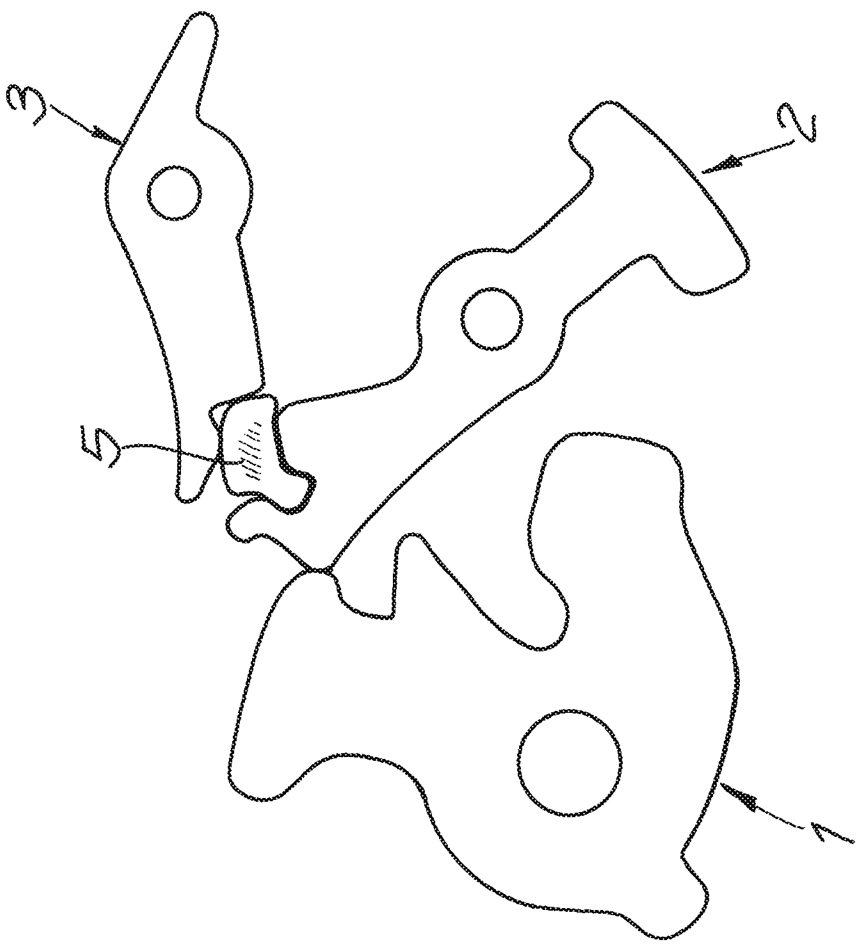

In the case of the multi-pawl locking mechanism 1, 2, 3 according to FIG. 6, a rotary latch 1, a first pawl 2 designed as a comfort pawl and a second pawl 3 are provided. In this case, the first pawl 2 interacts with the pawl 3 via the latching element 5 mounted in or on the first pawl 2. The individual locking mechanism components 1, 2, 3 are usually made of steel. However, there is also the possibility of providing individual locking mechanism components 1, 2, 3 made of cast zinc or plastics material, for example the second pawl 3 in the multi-pawl locking mechanism 1, 2, 3 according to FIG. 6. The latching element 5, which is to be described in more detail below, can also be made of cast zinc or plastics material.

All of the basically shown variants of the locking mechanism 1, 2, 3 are characterized by the latching element 5 which, in the simple locking mechanism 1, 2, is arranged in the engagement region between the rotary latch 1 and the pawl 2 or, in the multi-pawl locking mechanism 1, 2, 3 according to FIG. 4, is arranged in the engagement region between the rotary latch 1 and the pawl 3. In the multi-pawl locking mechanism 1, 2, 3 according to FIG. 6, the latching element 5 is arranged between the comfort pawl 2 and the pawl 3. As a result, the latching element 5 is generally located in the engagement region between two locking mechanism components 1, 2; 1, 3 or 2, 3.

For this purpose, the latching element 5 in question is mounted on the locking mechanism component 1, 2 which accommodates said latching element. In the context of the embodiments according to FIGS. 1 A, B to 5 A, B, C and 7 to 10, the locking mechanism component 1, 2 in question is the rotary latch 1. By contrast, in the multi-pawl locking mechanism 1, 2, 3 according to FIG. 6, the latching element 5 is mounted in or on the first pawl 2 as the locking mechanism component 2. In addition, the latching element 5 for the most part performs pivoting movements in a plane E of the locking mechanism, i.e. a plane spanned by the relevant locking mechanism 1, 2 or 1, 2, 3.

According to the invention, the latching element 5 is now additionally equipped with a guide extension 6 projecting from the plane E of the locking mechanism. The guide extension 6 is used for additional axial and/or radial guidance of the latching element 5, as will be explained in more detail below. The projecting design of the guide extension 6 relative to the plane E of the locking mechanism can best be seen in the relevant side view of the locking mechanism 1, 2, 3 in FIGS. 1 A, B and 3 A, B, C.

In this case, the guide extension 6 can in principle be formed in one piece with the latching element 5, for example as an embossing. This is shown in FIGS. 1A and 1B. It can be seen here that, in the side view, partially in section, the latching element 5 is equipped with the guide extension 6 or the embossing which projects relative to the plane E of the locking mechanism. As a result, the latching element 5 can, in the example, rest against a housing 7 accommodating the locking mechanism 1, 2, 3. According to the embodiment, the housing 7 is a lock housing 7 which is used to close a lock case (not shown in detail) for mounting the locking mechanism 1, 2, 3. In any case, it can be seen from the side view, partially in section, according to FIG. 1B, that the embossing or the guide extension 6 is formed on one side of the latching element 5, such that the latching element 5 can rest against the housing 7 or the lock housing 7 on one side and, in this way, a desired axial guidance in the axial direction A, i.e. in the direction of a defined axis or axis of rotation A, is supported relative to the associated locking mechanism component 1, 2 for mounting the latching element 5.

Figure 2:
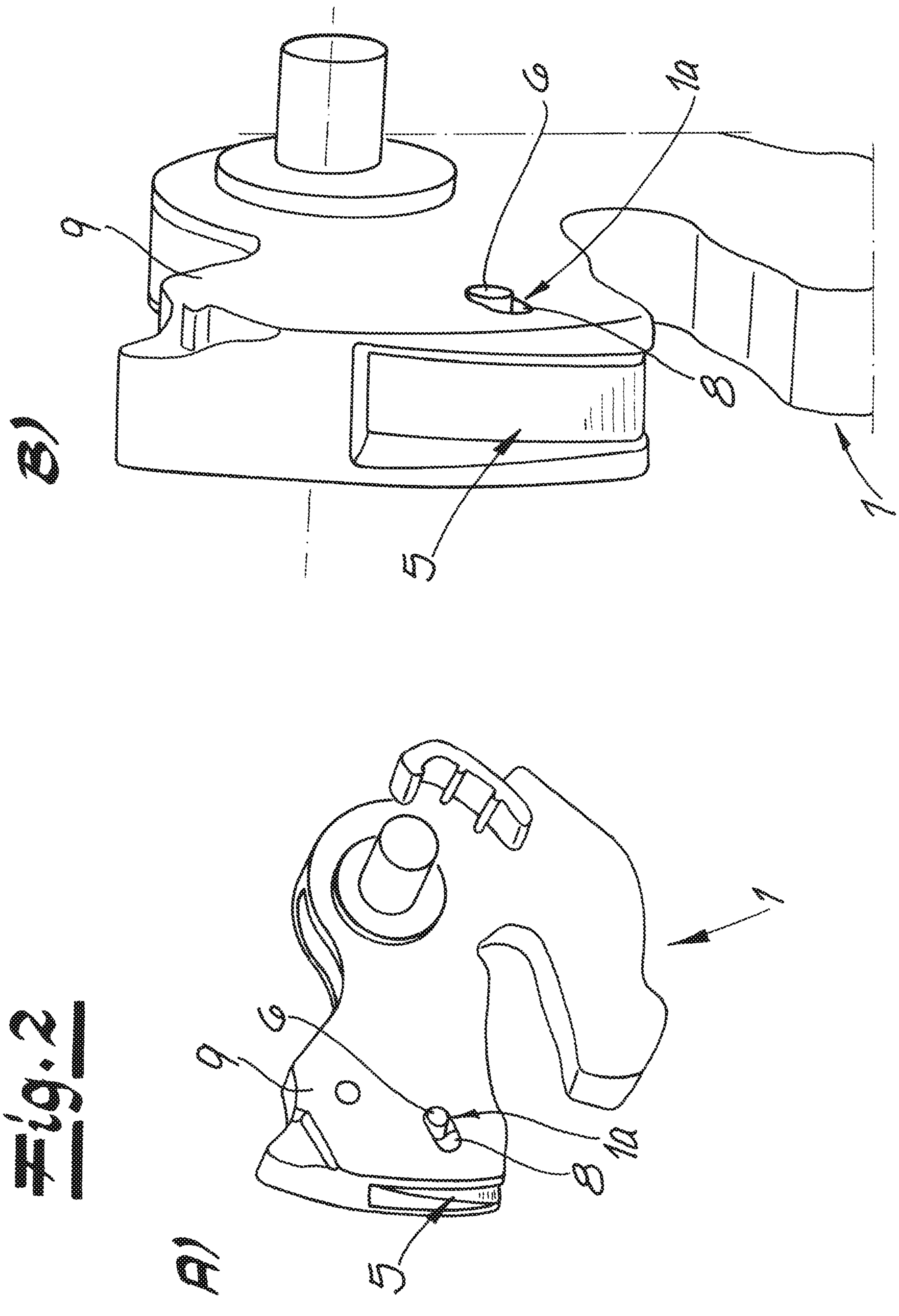

Instead of the embossing for providing the guide extension 6 in the context of the variant according to FIG. 1 A, B, the guide extension 6 can also be a different material than the latching element 5 for its implementation. For example, the guide extension 6 may be implemented as a molded portion of a plastics casing of the latching element 5, which molded portion protrudes in the same way relative to the plane E of the locking mechanism. In an alternative embodiment, the guide extension 6 can also be designed as a separate component which is connected to the latching element 5 by means of clipping or a press fit. Combinations are of course also conceivable. A variant of the guide extension 6 is shown in FIG. 2 A, B. In this case, the guide extension 6 is a push-through pin which is guided in a recess 8 of the rotary latch 1 in the example. The push-through pin may be inserted into a recess in the latching element 5 for this purpose. The recess 8 of the rotary latch 1 is in this case realized and provided in a casing 9 of the rotary latch 1 made of, for example, plastic.

In order to manufacture this variant according to FIG. 2 A, B, the rotary latch 1 and the latching element 5 can be placed together in an injection molding tool. By means of the pocket formed in this way for accommodating the latching element 5, the casing 9 in this case firstly ensures that the latching element 5 is pivotably mounted on the rotary latch 1, the rotary latch 1 being equipped with a mounting point 1*a* for this purpose, which can in particular be seen in FIGS. 8A and 8B and is designed as a recess. The casing 9 made of plastics material, in conjunction with the recess or mounting point 1*a* in the rotary latch 1, now ensures the pivotable mounting of the latching element 5 on the rotary latch 1 in the example.

As a result of the interplay between the push-through pin or guide extension 6 and the recess 8, a radial guidance of the latching element 5 is now additionally realized and implemented. For this purpose, the recess 8 is arcuate, such that the extension 5 follows the arcuate recess 8 during a pivoting movement relative to the mounting point 1*a* thereof in the rotary latch 1, or the push-through pin 8 is guided in an arcuate manner in the recess 8. The latching element 5 is also provided with the desired radial guidance as a result. In addition, the walls which delimit the recess 8 form an end stop for the push-through pin 8.

Figure 3:
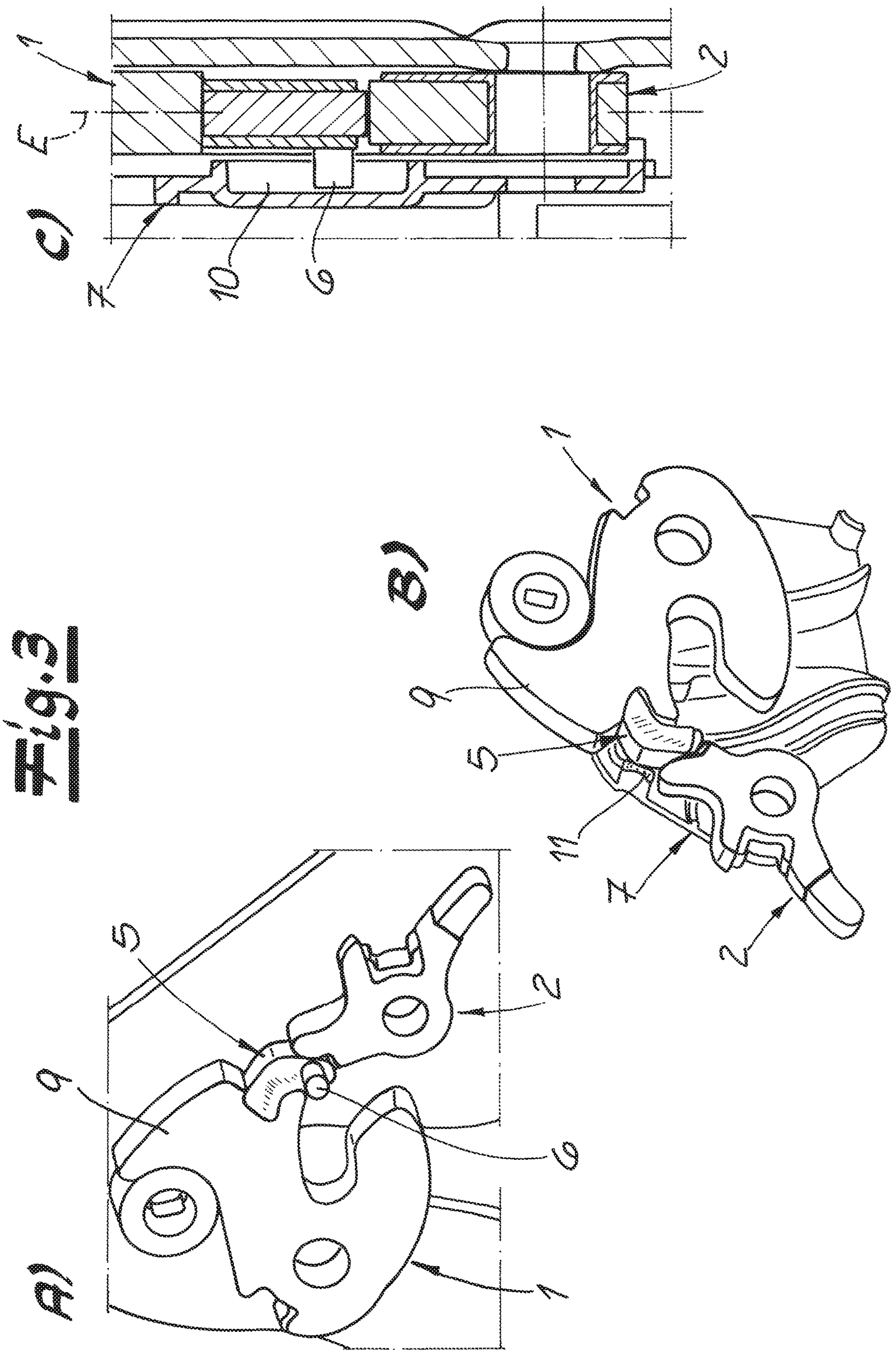

In the embodiment variant according to FIG. 3, the guide extension 6 located there, which is also designed, by way of example, as a pin or push-through pin, enters a recess 10 in the housing or lock housing 7. In this case, too, the guide extension 6 is guided by the interaction with the recess 10 in the housing or lock housing 7. This can take place again radially and/or axially, comparable to that already described above in detail. In principle, the guide extension 6 can, however, also rest, in a planar manner, against the housing 7 or lock housing 7 which accommodates the locking mechanism 1, 2, 3, as shown by the embodiment variant according to FIG. 1 A, B.

Figure 5:
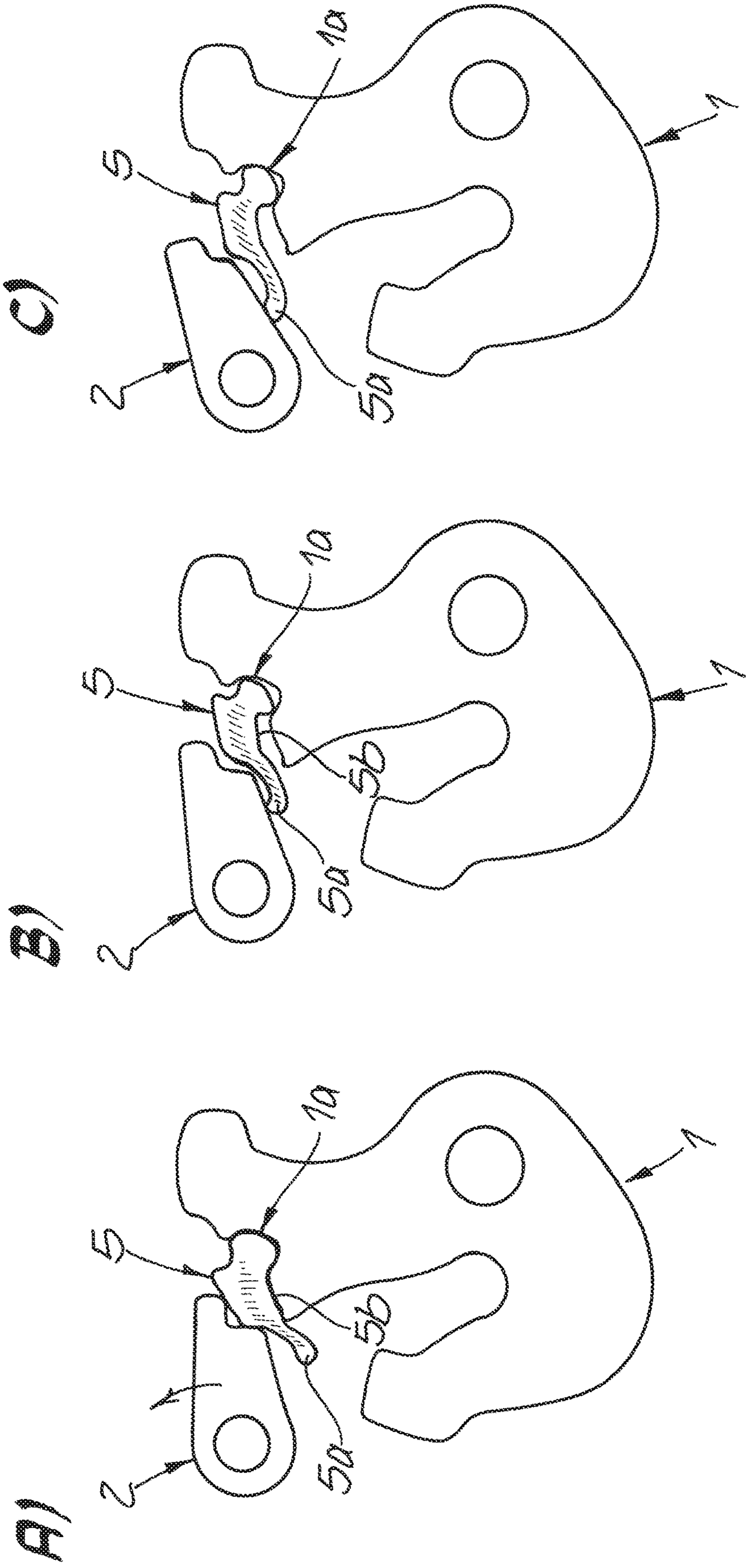

In the context of the fifth embodiment variant according to FIG. 5, it can be seen that the latching element 5 has a projection 5*a*. In the context of this variant, the latching element 5 is again mounted in the region of the mounting point 1*a* or an associated recess in or on the rotary latch 1. The projection 5*a* on the latching element 5, in conjunction with the pawl 2, in this case ensures that an end stop for the latching element 5 is realized and implemented in this way. This can be seen when comparing the different functional positions according to FIG. 5.

In fact, the closed state of the simple locking mechanism 1, 2 is shown in this case in the left-hand view in FIG. 5A. In this closed state, a contact surface 5*b* of the latching element 5 rests against the rotary latch 1. If, proceeding from this closed state shown in the left-hand view in FIG. 5A, the pawl 2 is opened by a motor or manually, for example by lifting off the rotary latch 1 with the aid of a release lever, this corresponds to the fact that the pawl 2 performs a counterclockwise rotation about the axis thereof. As a result, the latching element 5 also moves relative to the mounting 1*a* thereof on the rotary latch 1 with the contact surface 5*b*, moving away from the rotary latch 1 until the projection 5*a* on the latching element 5 comes to rest against the pawl 2, as shown in the functional view according to FIG. 5 B, C. That is to say, the projection 5*a* in this case acts as an end stop interacting with the pawl 2 during the opening process of the locking mechanism 1, 2.

Figure 7:
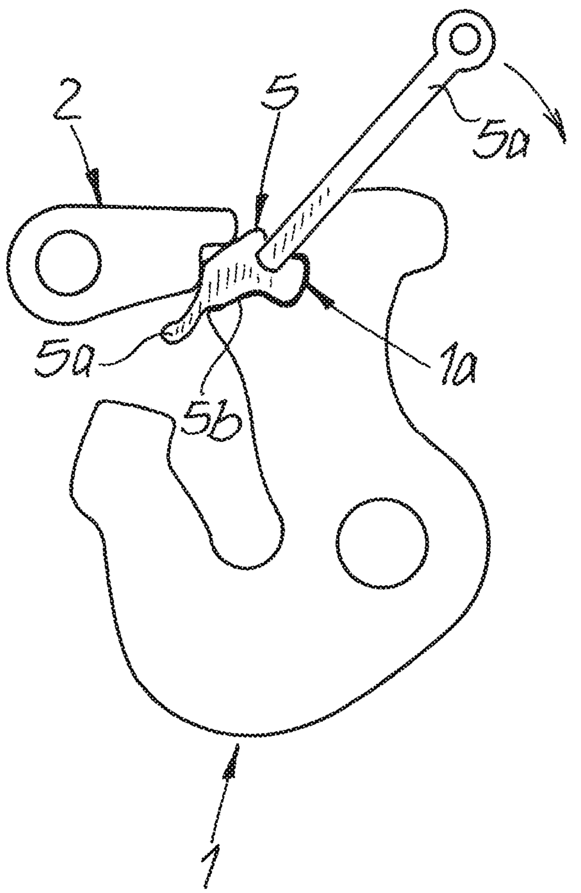

Alternatively, however, the projection 5*a* on the latching element 5 can also act and be designed as an opening lever for the latching element 5, as is illustrated in the embodiment according to FIG. 7. Then, for example, an application of force in the indicated direction of the arrow of the projection 5*a* of the latching element 5 supports an opening process of the locking mechanism 1, 2. In fact, in this case the latching element 5 is equipped with two projections 5*a*, specifically a projection 5*a* acting as an end stop at the pawl-side end of the latching element 5 and a further projection 5*a* at the opposite end of the latching element 5 as an opening lever for the latching element 5. In any case, in this way the latching element 5 can be used via the opening lever or the projection 5*a* to support an opening process of the locking mechanism 1, 2 in the example. For this purpose, the previously mentioned release lever may not only ensure that the pawl 2 is lifted from the rotary latch 1 by a pivoting movement in the counterclockwise direction, but this opening process is additionally supported by the release lever (or another lever) acting on the projection 5*a* in the direction of force shown in FIG. 7 and ensuring that the latching element 5 is pivoted relative in the clockwise direction relative to the mounting point 1*a* thereof on the rotary latch 1.

A comparable stop 11 or end stop for limiting the pivoting movement of the latching element 5 and as an alternative to the projection 5*a* is also shown in the embodiment variant according to FIG. 3B. The stop 11 which is formed in or on the housing or lock housing 7 is provided and shown in said figure. The stop 11 in this case again ensures that any pivoting movements of the latching element 5 relative to the rotary latch 1 that supports said latching element are limited in the example.

Figure 9:
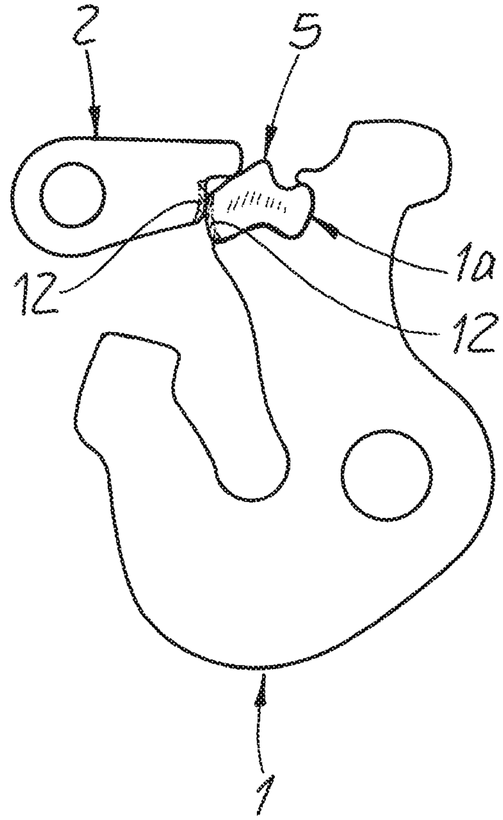

FIG. 9 shows a further variant of a simple locking mechanism 1, 2 having a rotary latch 1 and a pawl 2 in such a way that the latching element 5 or the pawl 2 mounted on the rotary latch 1 at the mounting point 1*a* have a reinforcement 12 in the region of the relevant mutual contact surface. According to the embodiment in FIG. 9, the design is such that both the latching element 5 and the pawl 2 have the reinforcement 12 in question in the region of the mutual contact surface. The reinforcement 12 can be a welded-on plate or a sheet of steel, for example. In addition, it is advantageous in this case to work with a particularly friction-optimized surface in order to make the opening process of the locking mechanism 1, 2 as low-effort and low-noise as possible.

Figure 8B:
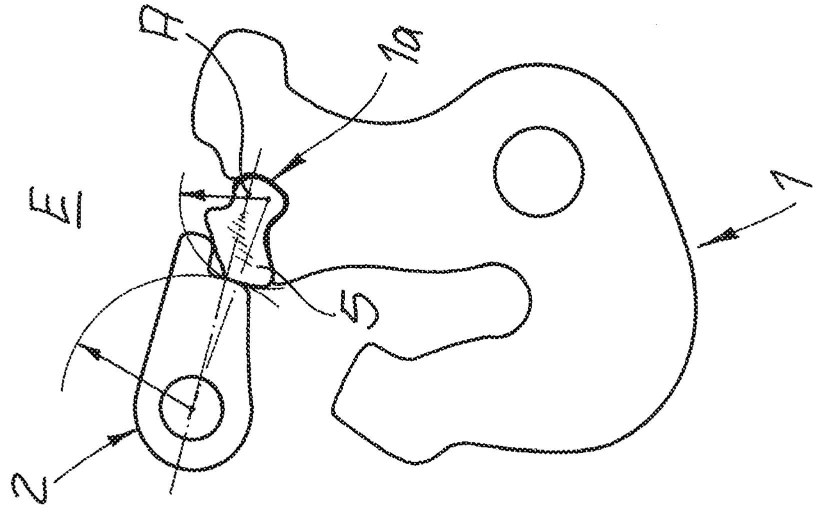
Figure 8A:
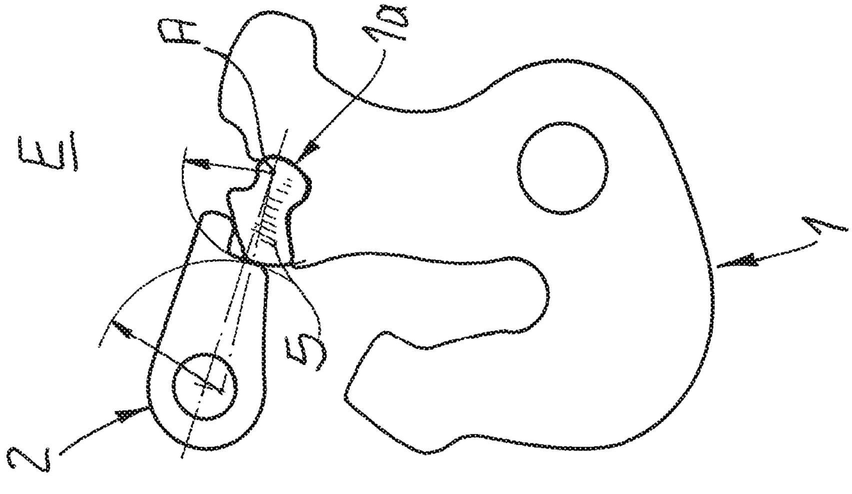

In the embodiment according to FIGS. 8A and 8B, an undercut is also shown. In this case, FIG. 8A shows an undercut on the pawl 2, whereas, in the variant according to FIG. 8B, an undercut on the latching element 5 in the relevant simple locking mechanism 1, 2 shown in said figure is shown and drawn in. In both cases, the latching element 5 is again pivotably mounted on the rotary latch 1 in the locking plane E of the locking mechanism, specifically at the mounting point 1*a*.

The undercut of the pawl 2 shown in FIG. 8A means that the pawl 2 is acted upon in the region of the mutual contact surface between the latching element 5 and the pawl 2 with a force vector originating from the axis A of the latching element 5, which force vector extends below a connecting line between the two axes of rotation, such that the pawl 2 is acted upon by a closing torque in the direction of the latching element 5. By contrast, the undercut of the latching element 5 according to FIG. 8B is designed such that the pawl 2 acts on the latching element 5 with a force vector directed below the axis A of the latching element 5, which in this case causes the contact surface 5*b* of the latching element 5 to rest against the rotary latch 1 or presses the latching element 5 into contact with the rotary latch 1.

Figure 10:
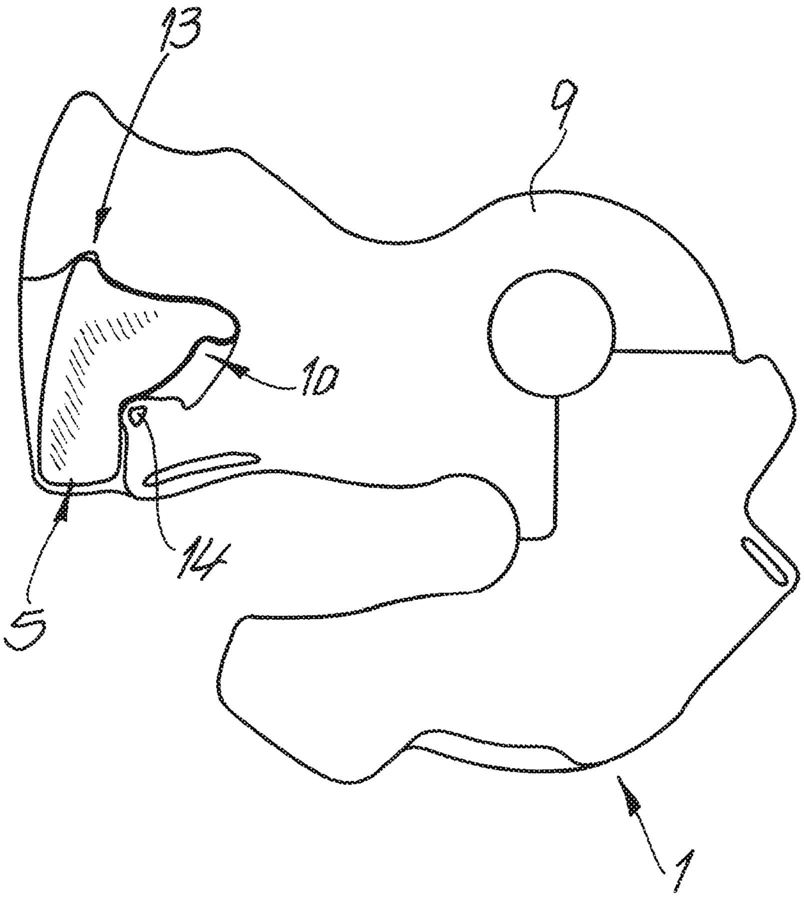

Finally, a further and particularly acoustically favorable variant is shown in the further embodiment according to FIG. 10. In fact, it can be seen here that the latching element 5, which is again mounted in or on the rotary latch 1, only has a load contact 13, which is shown in FIG. 10, when the latching element 5 is acted upon with a significant force in the direction of the rotary latch 1. In fact, the metal latching element 5 then comes into contact with a likewise metal core of the rotary latch 1. Otherwise, the casing 9 of the rotary latch 1 supporting the latching element 5 ensures that such a metal contact is not observed during normal operation; rather, the latching element 5 is only mounted in the interior of the pocket formed in the casing 9 and relative to the mounting point 1*a*.

In addition, a spring pocket 14 can also be seen in this embodiment, which is formed in or on the casing 9 of the rotary latch 1. The spring pocket 14 ensures a low-noise end stop of the latching element 5. In addition, a backlash-free mounting of the latching element 5 is provided by the spring pocket 14, even without force transmission by the pawl 2.

REFERENCE SIGNS locking mechanism 1, 2, 3
rotary latch 1
mounting 1*a*
mounting point 1*a*
locking mechanism components 1, 2, 3
locking mechanism component 2
multi-pawl locking mechanism/multiple locking mechanism 1, 2, 3
simple lock 1, 2
pre-latching pawl 2
comfort pawl 2
pawl 2
pawl 2, 3
pre-latching bolt 4
latching element 5
projection 5*a*
contact surface 5*b*
guide extension 6
housing 7
lock housing 7
recess 8
push-through pin 8
casing 9
recess 10
stop 11
reinforcement 12
load contact 13
spring pocket 14
axial direction A
axis A
locking mechanism plane E

The invention claimed is:

1. A motor vehicle lock comprising:

a locking mechanism including locking mechanism components, the locking mechanism components including at least a rotary latch and a pawl;

a latching element arranged in an engagement region between the rotary latch and the pawl, the latching element being pivotably mounted on the rotary latch and arranged in a plane of the locking mechanism, wherein the latching element has a guide extension which projects relative to the plane of the locking mechanism for additional axial and/or radial guidance of movement of the locking mechanism components as the locking mechanism transitions between a locked state and an open state; and a lock housing that accommodates the locking mechanism including the rotary latch and the pawl in an interior of the lock housing, wherein the guide extension contacts directly against a surface of the lock housing as the locking mechanism transitions between the locked state and the open state to provide the additional axial and/or radial guidance.

2. The motor vehicle lock according to claim 1, wherein the guide extension is formed in one piece with the latching element.

3. The motor vehicle lock according to claim 1, wherein the guide extension is formed as a separate element relative to the latching element.

4. The motor vehicle lock according to claim 1, wherein the guide extension engages in a recess in one of the locking mechanism components which supports the guide extension.

5. The motor vehicle lock according to claim 4, wherein the recess is provided in a casing of the one of the locking mechanism components.

6. The motor vehicle lock according to claim 1, wherein the guide extension engages in a recess in the lock housing.

7. The motor vehicle lock according to claim 1, wherein the latching element has a projection.

8. The motor vehicle lock according to claim 7, wherein the projection is formed as an end stop which interacts with the pawl.

9. The motor vehicle lock according to claim 7, wherein the projection is formed as an opening lever for the latching element.

10. The motor vehicle lock according to claim 6, wherein a stop for the latching element is provided on the lock housing.

11. The motor vehicle lock according to claim 1, wherein the latching element and/or the pawl have reinforcement in a region of a mutual contact surface.

12. The motor vehicle lock according to claim 1, further comprising a pre-latching pawl and/or comfort pawl.

13. The motor vehicle lock according to claim 1, wherein the pawl and/or the latching element have an undercut.

14. The motor vehicle lock according to claim 1, wherein the latching element is mounted in a casing of one of the locking mechanism components which supports the latching element.

15. The motor vehicle lock according to claim 2, wherein the guide extension is formed as an embossing on the latching element.

16. The motor vehicle lock according to claim 3, wherein the guide extension is formed as a separate push-through pin and/or a component of a cover of the latching element.

17. The motor vehicle lock according to claim 14 further comprising a damping element formed on the casing.

18. The motor vehicle lock according to claim 17, wherein the damping element is a spring pocket.

* * * * *